E. MOWRY.
HAY LOADER.
APPLICATION FILED DEC. 29, 1915.
1,275,722.
Patented Aug. 13, 1918.
2 SHEETS—SHEET 1.
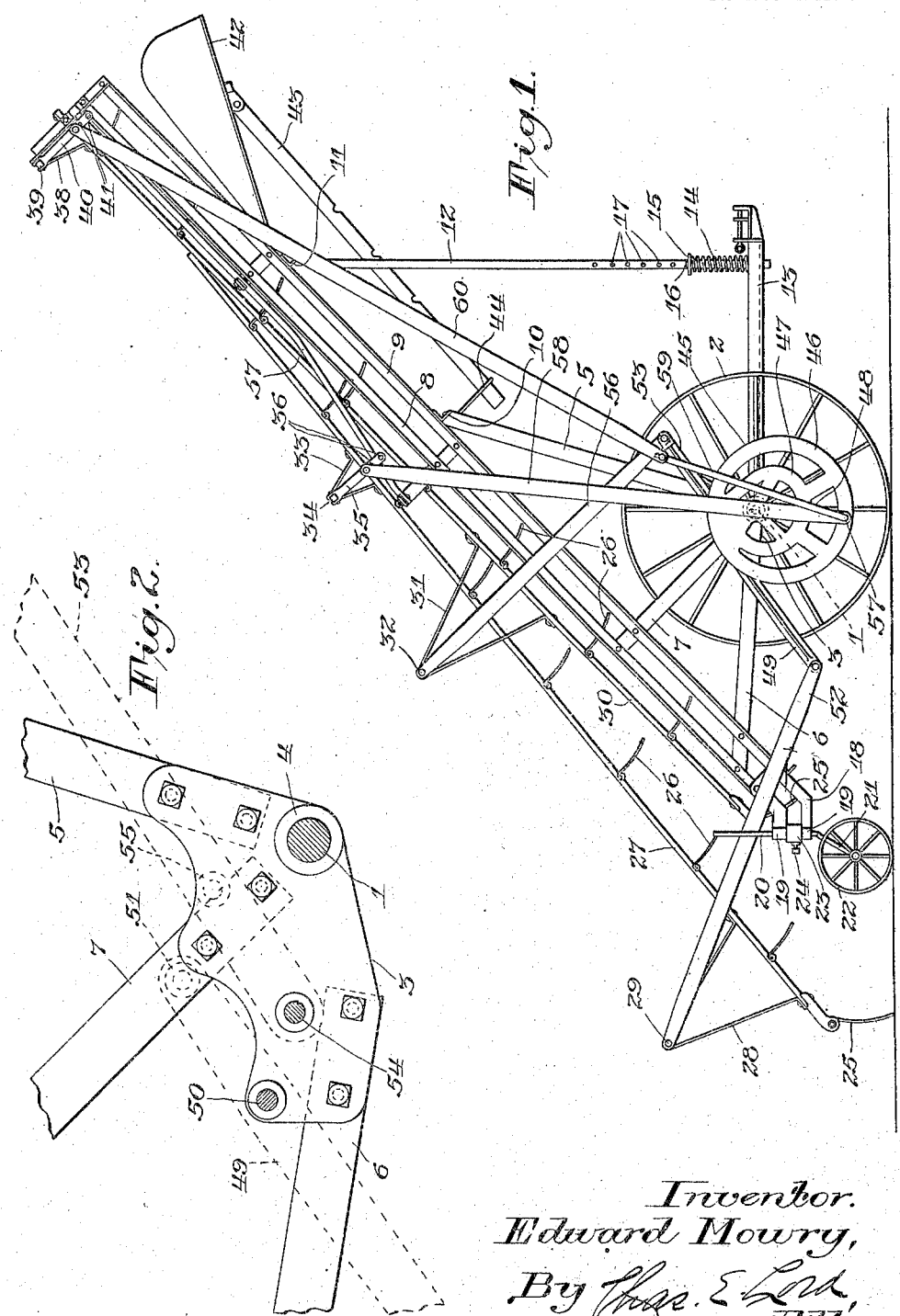
Inventor.
Edward Mowry,
By Chas. E. Lord,
Atty.

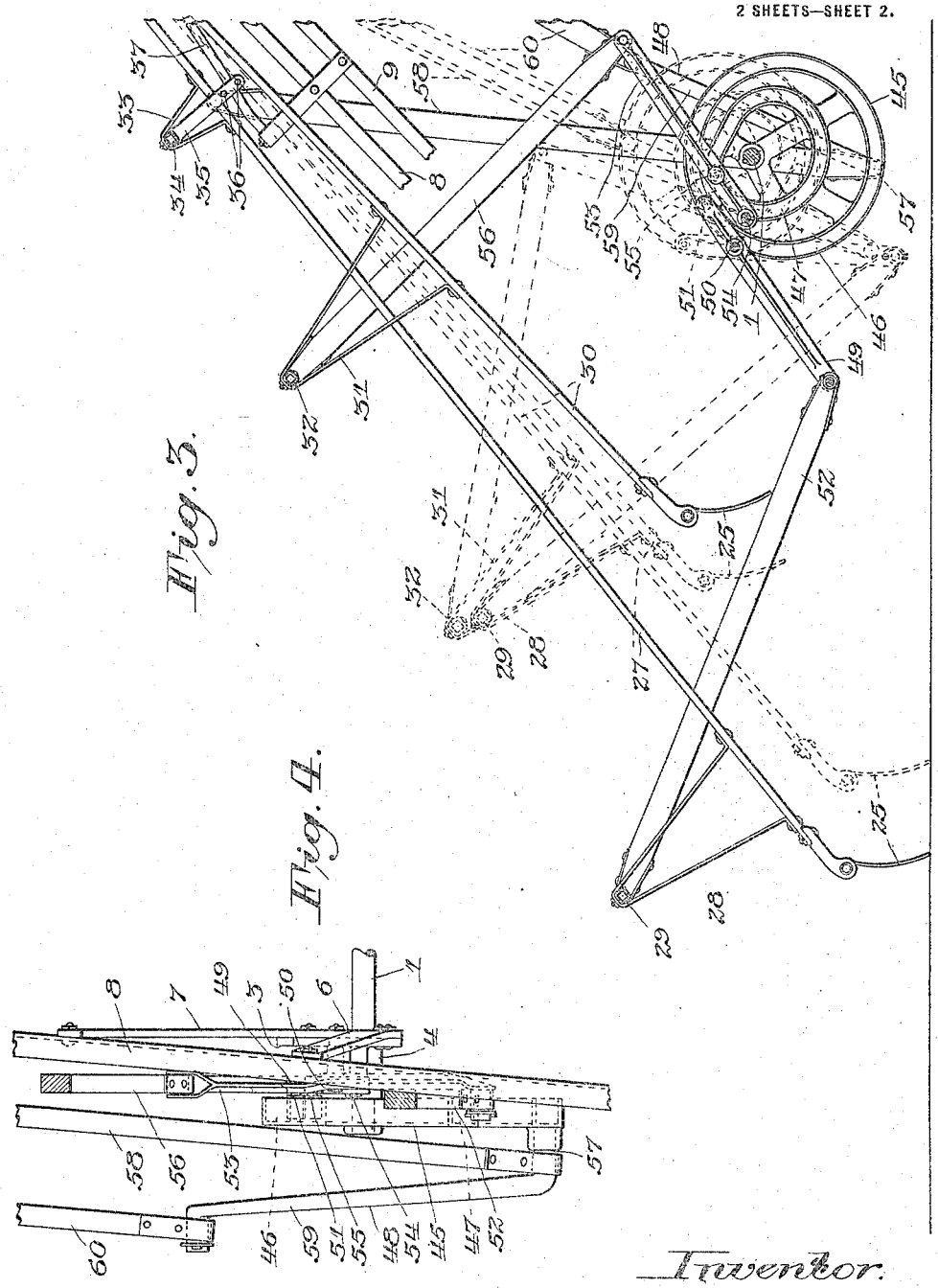

UNITED STATES PATENT OFFICE.

EDWARD MOWRY, OF STERLING, ILLINOIS, ASSIGNOR TO INTERNATIONAL HARVESTER COMPANY OF NEW JERSEY, A CORPORATION OF NEW JERSEY.

HAY-LOADER.

1,275,722.  Specification of Letters Patent.  Patented Aug. 13, 1918.

Application filed December 29, 1915. Serial No. 69,144.

*To all whom it may concern:*

Be it known that I, EDWARD MOWRY, a citizen of the United States, residing at Sterling, in the county of Whiteside and State of Illinois, have invented certain new and useful Improvements in Hay-Loaders, of which the following is a full, clear, and exact specification.

My invention relates to hay loaders of the walking rake type having separate gangs of rising and falling reciprocatory rake bars operating above an inclined elevator frame to gather the hay from the ground and elevate and deliver it to the receiving rack.

One object of the invention is to improve means for imparting a reciprocating movement to the rake gangs, and also for controlling the orbital path of the hay raking elements.

Another object is to provide a gearless loader adapted to meet all of the requirements for successful commercial operation.

These objects are attained by means of the mechanism illustrating one embodiment of my invention, as shown in the accompanying drawings, in which—

Figure 1 is a side elevation of a hay loader of the type indicated and embodying my invention;

Fig. 2 is a detached detail, on an enlarged scale, of part of the rake controlling means shown in Fig. 1;

Fig. 3 is a side elevation of part of Fig. 1 and illustrating the operation of the rake actuating mechanism; and Fig. 4 is a rear elevation, on an enlarged scale, of part of the rake actuating means at one end of the axle and at one side of the machine, as shown in Fig. 1 of the drawings, one side only of the machine being shown, the rake actuating mechanism comprising duplicate parts disposed upon the sides of the machine.

The same reference numerals designate like parts throughout the several views.

1 represents an axle, 2 a traction wheel mounted thereon, 3 a bracket member having a bearing sleeve 4 integral therewith and in which the axle 2 is journaled, 5 a vertically disposed frame member having its lower end secured to the bracket 3, 6 a horizontally disposed rearwardly extending frame member having its draft end secured to the bracket 3, 7 an inclined frame member intermediate the members 5 and 6, having its front end secured to the bracket 3. 8 and 9, respectively, represent upper and lower elevator side frame members spaced apart vertically and having their lower ends secured to the rear ends of the frame members 6 and 7, 10 a transverse bar having its opposite ends secured to elevator side frame members 9, to which are secured the upper ends of the frame member 5, 11 a transversely disposed bar having its opposite ends secured to the frame bars 9 near their upper ends, 12 a vertically disposed bar having its upper end connected with the bar 11 and its lower end slidably and yieldingly connected with the front end of a draft member 13 forming a part of a draft frame structure pivoted upon the axle, 14 a compression spring encircling the lower end of the bar 12 and reacting between the member 13 and a collar 15 loosely mounted upon the bar and secured by a pin 16 that may be selectively received by any of a series of openings 17 through the bar 12. 18 represents bracket members secured to the lower ends of the elevator frame bars 8 and 9 and having vertically disposed bearings 19, in which is journaled the stem 20 of a crank arm 21 having a caster wheel 22 journaled upon its lower end, and 23 is an adjusting collar disposed between the bearings 19 and receiving the stem 20, 24 a set screw securing the collar in any desired position of adjustment for the purpose of adjusting the receiving end of the elevator relative to the surface of the ground.

In common with loaders of the type indicated, there are a series of rake bars disposed above the elevator frame and adapted to have a reciprocating movement, the bars carrying hay raking elements 25 upon their rear lower ends and pivoted elevating tines 26 spaced apart throughout the length of the bars. The bars are disposed alternately in separate gangs in the usual way, the bars 27 of one gang having bracket members 28 secured to their lower ends whereby they are connected to a transversely disposed bar 29 extending across the machine. The bars 30 of the remaining gang have like bracket members 31 secured thereto near their middle, whereby they are connected to a like transversely disposed bar 32. 33 represents bracket members secured to the bars 27 near their upper ends, whereby they are connected with a transverse bar 34 having depending arms 35 at its opposite ends, upon the free ends of which are journaled rollers 36 that are adapted to travel upon the rear end of a track rail 37 carried by the side frame members 8 and 9 of the elevator. The bars 30 of the remaining gang have like bracket members 38 secured to their front ends, whereby they are connected to a transverse bar 39 having depending arms 40 at its opposite ends, upon which are journaled rollers 41 adapted to travel upon the front ends of the track rail 37. 42 represents an adjustable chute pivotally connected with the delivery end of the elevator frame and supported by means of a notched bar 43, having its front end pivotally connected with the bottom of the chute and its opposite end slidably received by a loop member 44 carried by the transverse frame member 10 and which may be selectively received by the notches in the bar as the chute is raised or lowered. Secured to each end of the axle 1 is a cam member 45, having an outside cam race 46 and an inside cam race 47, and 48 represents a double crank preferably secured to the cam member and rotating therewith. 49 represents a rearwardly extending lever pivoted near its front end upon a stud 50 carried by the bracket member 3 and having a roller 51 journaled upon its front end adapted to travel in the outside cam race 46, and 52 represents a pitman connecting the rear end of the lever with the end of the rake gang supporting bar 29. 53 represents a forwardly extending lever having its rear end pivoted upon a stud 54 carried by the bracket 3, and having a roller 55 journaled thereon intermediate its ends and adapted to travel in the inside cam race 47, and 56 a pitman connecting the front end of the lever with the end of the rake gang supporting bar 32. The inside arm 57 of the double crank 48 is connected with the depending arm 35 upon the rake gang supporting bar 34 by means of a pitman 58, and the outside arm 59 of the double crank with the depending arm 40 upon the rake gang supporting bar 39 by means of a pitman 60.

It being understood that the rake actuating parts as heretofore described are duplicated upon the opposite side of the machine, the mechanism operates as follows: The axle rotates with the traction wheels, rotating the cam members and the double cranks, and levers 49 and 53 impart a rising and falling movement to the rear ends of the rake gangs as they are reciprocated by means of the pitmen 58 and 60.

Having shown and described one embodiment of my invention, I do not desire to have it confined to the specific details of the structure as illustrated, it being understood that many changes may be made in the form, proportion and organization of its various parts without departing from the spirit of the invention as indicated in the appended claims.

What I claim as new is:

1. In a hay loader, the combination of an elevator frame, rakes carried thereby and slidably supported at their upper ends, a cam member rotatably mounted on said frame, members guided by said cam member, and means connecting said guided members to said rakes, said connecting means forming the sole supports for the lower ends of said rakes.

2. In a hay loader, the combination of an elevator frame, rakes movable relatively thereto, a cam member rotatably carried thereby, members pivoted on said frame and actuated by said cam member, and means for connecting said pivoted members directly to said rakes for transmitting motion thereto, said rakes being supported at their lower ends solely by said connecting means.

3. In a hay loader, the combination of an elevator frame, rakes movable relatively thereto, an actuated cam member having two cam races, members guided by said cam races and directly connected, respectively, to said rakes for transmitting a rising and falling motion thereto, and means including a crank directly connected with said cam member and to said rakes for reciprocating said rakes over said elevator frame.

4. In a hay loader, the combination of an elevator frame, rakes movable relatively thereto, an actuated cam member having two cam races, members guided by said cam races and operatively connected, respectively, to said rakes for transmitting motion thereto, and crank members directly connected to said cam member and operatively connected to said rakes for giving the latter a reciprocatory movement over said elevator frame.

5. In a hay loader, the combination of a rotatable shaft, wheels supporting the same, an elevator frame carried thereby, rakes movable relatively to said elevator frame, a cam member mounted on and actuated by said shaft having two cam races, levers having one end of each guided respectively by said cam races and being operatively connected to said rakes for transmitting motion thereto, and means including a crank member secured to said cam member and arms from the crank member to the rakes for transmitting a reciprocatory movement to said rakes over said elevator frame.

In testimony whereof I affix my signature.

EDWARD MOWRY.

Copies of this patent may be obtained for five cents each, by addressing the "Commissioner of Patents, Washington, D. C."